(12) United States Patent
Zubalsky et al.

(10) Patent No.: US 8,139,932 B2
(45) Date of Patent: Mar. 20, 2012

(54) IMAGING SYSTEM AND METHOD (75) Inventors: Izhack Zubalsky, Herzliya (IL); Yair Altshuler, Rishon LeZion (IL)

(73) Assignee: Israel Aerospace Industries Ltd., Lod (IL)

( * ) Notice: Subject to any disclaimer, the term of this patent is extended or adjusted under 35 U.S.C. 154(b) by 0 days.

(21) Appl. No.: 12/811,017

(22) PCT Filed: Dec. 14, 2008

(86) PCT No.: PCT/IL2008/001615
§ 371 (c)(1), (2), (4) Date: Jun. 28, 2010

(87) PCT Pub. No.: WO2009/083953
PCT Pub. Date: Jul. 9, 2009

(65) Prior Publication Data
US 2010/0310242 A1   Dec. 9, 2010

(30) Foreign Application Priority Data
Jan. 1, 2008   (IL) .......................................... 188524

(51) Int. Cl.
G03B 39/00 (2006.01)
H04N 7/18 (2006.01)
(52) U.S. Cl. .......................................... 396/12; 348/144
(58) Field of Classification Search .................... 396/12; 348/144
See application file for complete search history.

(56) References Cited

U.S. PATENT DOCUMENTS

| | | | |
|---|---|---|---|
| 4,825,232 A | 4/1989 | Howdle | |
| 5,219,132 A | 6/1993 | Beckerleg et al. | |
| 5,368,254 A * | 11/1994 | Wickholm | 244/3.16 |
| 5,383,645 A | 1/1995 | Pedut et al. | |
| 5,589,901 A | 12/1996 | Means | |
| 5,598,207 A | 1/1997 | Kormos et al. | |
| 5,897,223 A | 4/1999 | Tritchew et al. | |
| 6,056,237 A * | 5/2000 | Woodland | 244/3.15 |
| 6,193,188 B1 * | 2/2001 | Ahmad et al. | 244/3.16 |
| 6,708,943 B2 | 3/2004 | Ursan et al. | |
| 7,000,883 B2 * | 2/2006 | Mercadal et al. | 248/660 |
| 7,564,478 B2 * | 7/2009 | Baumann et al. | 348/146 |
| 2004/0173726 A1 | 9/2004 | Mercadal et al. | |
| 2009/0216394 A1 * | 8/2009 | Heppe et al. | 701/16 |
| 2009/0218447 A1 * | 9/2009 | Von Flotow et al. | 244/131 |
| 2010/0019120 A1 | 1/2010 | Burnham et al. | |

FOREIGN PATENT DOCUMENTS

| | | |
|---|---|---|
| JP | 04-095729 A | 3/1992 |
| JP | 2003-241260 A | 8/2003 |
| WO | WO 2004/067432 A2 | 8/2004 |
| WO | WO 2006/065892 A2 | 6/2006 |

* cited by examiner

OTHER PUBLICATIONS

*International Search Report (PCT/ISA/210) for PCT/IL2008/001615 dated Jul. 3, 2009. *Written Opinion (PCT/ISA/237) for PCT/IL2008/001615 dated Jul. 3, 2009.

*Primary Examiner* — Rodney Fuller
(74) *Attorney, Agent, or Firm* — Buchanan Ingersoll & Rooney PC (57) ABSTRACT

An optical imaging system is provided for an airborne platform or the like, including an image acquisition unit having an optical axis and configured for providing images in a direction along said axis, the image acquisition unit being mounted to a pointing mechanism configured for selectively pointing said optical axis in a desired direction. The system also has an optical shield configured for shielding said image acquisition unit from receiving undesired electromagnetic radiation from at least one direction different from said desired direction.

21 Claims, 9 Drawing Sheets

IMAGING SYSTEM AND METHOD

FIELD OF THE INVENTION

This invention relates to imaging systems and methods, in particular such systems that may be pointed in desired direction, especially such systems that are mounted onto an air vehicle.

BACKGROUND OF THE INVENTION

There are a variety of applications in which a camera or other imaging apparatus is carried on an airborne platform, and in which it may be desired to point the camera in a particular direction.

For example, by way of general background interest, airborne platforms comprising cameras are disclosed in U.S. Pat. Nos. 5,589,901 and 4,825,232.

Also by way of general background interest, pointing mechanisms for cameras, imaging systems and the like are disclosed in U.S. Pat. No. 5,897,223, WO 2006/065892, U.S. Pat. No. 5,368,254, WO 2004/067432, U.S. Pat. Nos. 5,598,207 and 6,708,943.

SUMMARY OF THE INVENTION

According to one aspect of the invention there is provided an optical imaging system for an airborne platform or the like, comprising an image acquisition unit having an optical axis and configured for providing images in a direction along said axis, said image acquisition unit being mounted to a pointing mechanism configured for selectively pointing said optical axis in a desired direction, and further comprising an optical shield configured for shielding said image acquisition unit from receiving undesired electromagnetic radiation from at least one direction different from said desired direction.

The optical shield may be configured for shielding said image acquisition unit from receiving unwanted electromagnetic radiation originating in at least one direction inclined at an angle not less than a shielding angle to the optical axis, wherein said shielding angle is any suitable angle greater than 0°. In some embodiments the shielding angle may be not less than 60°, for example In some embodiments the shielding angle may be not less than 45°, for example. In some embodiments the shielding angle may be not less than 30°. In some embodiments the shielding angle may be not less than 20°, for example. In some embodiments the shielding angle may be not less than 10°, for example. In some embodiments the shielding angle may be about 5°, or alternatively less than about 5°, for example.

The pointing mechanism may comprise a base adapted for mounting the system to the airborne platform or the like, a bracket for mounting said image acquisition unit thereto, and a suitable pan and tilt mechanism for enabling the bracket to be positioned in any desired orientation with respect to said base.

Optionally, the pan and tilt mechanism may comprises any suitable gimbal mechanism, including any number of gimbals, for example a pan gimbal and a tilt gimbal, for enabling the optical axis to be pointed along any desired azimuth and elevation within a predetermined field of regard.

The image acquisition unit may be configured for obtaining images in at least one of: the visible spectrum; beyond the visible spectrum, e.g. IR or UV; night vision mode.

In one embodiment, the shield comprises a plurality of cells, each cell having a central axis thereof substantially parallel to said optical axis, and wherein each said cell has an aperture to length ratio not less than that corresponding to said shielding angle. For example, the cells may be hexagonal cells in honeycomb arrangement. In one variation of this embodiment, the cells are of substantially the same size one to another, but in other variations of this embodiment, the cells may be of different sizes and/or shapes, and arranged in any suitable arrangement. In any case, the cells may be made from, or comprise a coating made from, a material that is substantially not reflective, at least with respect to said undesired electromagnetic radiation. The system may further comprise an aerodynamically contoured cover for enclosing said system, at least for a portion of operation thereof, and the cover is substantially transparent to a range of wavelengths that it is desired to image using the image acquisition system.

According to some embodiments of the invention, the shield is configured for being deployed between a retracted configuration, in which said shield has a compact retracted volume, and a deployed configuration, in which said shield has an extended volume having an aperture to length ratio not less than that corresponding to said shielding angle, wherein said image acquisition unit is configured for providing images via said aperture. The system may further comprise an aerodynamically contoured cover for enclosing said system in said retracted mode, said cover being selectively ejectable to enable said system to deploy to said deployed configuration.

In one such embodiment, in said retracted configuration said shield has a compact retracted length in a longitudinal direction parallel to said optical axis, and wherein in said deployed configuration, said shield has an extended length in said longitudinal direction, and a deployed aperture associated therewith, said extended length being substantially greater than said retracted length, and said extended length and deployed aperture providing said aperture to length ratio. The shield comprises a plurality of telescoping segments serially connected longitudinally to enable the segments to telescope between said retracted configuration, wherein said segments are nested, and said deployed configuration, wherein to provide said extended length. The said segments may be formed as generally tubular or frusto conical elements, having any desired cross section, for example circular, elliptical, polygonal, rectangular and so on.

In another such embodiment, in said retracted configuration said shield has a generally conical form having a minimum aperture associated with a forward end thereof, and a deployed configuration, in which said shield has a maximum aperture associated with said forward end substantially orthogonal to said optical axis, and a deployed length, said maximum aperture and deployed length providing said aperture to length ratio. The shield may comprise a forward portion comprising a plurality of resilient strut members, each cantilevered at an aft end thereof to an aft portion and having a forward end, said aft portion comprising a base member that is connected to said image acquisition unit, said resilient strut members being reversibly bendable to enable said forward portion to assume said general conical form in said retracted configuration, and to further assume said deployed configuration when released. In one variation of this embodiment, adjacent said resilient members are circumferentially spaced from one another along said base member, and said forward portion further comprises a flexible material provided at least in a space defined between each pair of adjacent said strut members, such as to provide a generally continuous shielding surface in said deployed configuration.

In another variation of this embodiment, adjacent said resilient members are in circumferentially proximity or abutment with one another along said base member, and are torsionally and longitudinally bendable such that in said retracted configuration, said forward ends of said strut members are in proximity to said optical axis, and in said deployed configuration, said forward ends are further spaced from said optical axis, and adjacent said strut members are in longitudinal proximity or abutment with one another to provide a generally continuous shielding surface. In retracted configuration, the forward ends of adjacent said strut members may be in intercalated relationship.

In another such embodiment, the shield comprises an inflatable tubular sleeve connectable to a pressurized fluid source, and having a longitudinal axis co-aligned with said optical axis, said sleeve having a deflated configuration corresponding to said retracted configuration, and an inflated configuration corresponding to said deployed configuration. In the retracted configuration said shield has a compact retracted length in a longitudinal direction parallel to said optical axis, and wherein in said deployed configuration, said shield has an extended length in said longitudinal direction, and a deployed aperture associated therewith, said extended length being substantially greater than said retracted length, and said extended length and deployed aperture providing said aperture to length ratio.

According to at least some embodiments of the invention, the system is adapted for pointing said optical system along a line of sight that is angularly displaced from a source of said undesired electromagnetic radiation such that said shield shields said image acquisition unit from receiving said undesired electromagnetic radiation originating from said source. In some applications of these embodiments, the source is any one of the sun, moon or an array of floodlights, and said system is operatively connected to a suitable detector that is configured for determining the location of said source relative to said system.

According to at least some embodiments of the invention, the system further comprises a pod onto which said system is mounted, said pod being configured for being mounted onto airborne platform or the like.

The present invention is also directed to an air vehicle comprising an optical imaging system according to the invention, said air vehicle comprising said airborne platform or the like. In one example, the air vehicle is an unmanned air vehicle (UAV).

The present invention is also directed to a method for imaging from an airborne platform or the like, comprising providing images in a direction along a line of sight (LOS), while substantially avoiding receiving undesired electromagnetic radiation from at least one direction different from said LOS. The LOS may be angularly displaced from a source of said undesired electromagnetic radiation such as to substantially avoid receiving said undesired electromagnetic radiation originating from said source. In at least some applications of the method, the source is any one of the sun, moon or an array of floodlights. The method may comprise providing a system to said airborne platform as defined herein. The airborne platform may be, for example, a UAV. The LOS may be aligned with any suitable target.

A feature of at least some embodiments of the invention is that the optical imaging system enables an airborne platform, such as for example a UAV, equipped with the imaging system to be used as a surveillance, targeting and/or attack vehicle, while tracking a target using an optical-based system, even where the target is close to an intense electromagnetic source, such as the sun for example, as observed by the vehicle.

Another feature of at least some embodiments of the invention is that effective shielding for an imaging system may be provided while reducing vibration effects on the image acquisition unit itself, even though the shield is mounted thereto.

According to one aspect of the invention this feature may be achieved by configuring the shield, in terms of its design, materials and mounting to the image acquisition unit, such that the structural rigidity of the shield is sufficient so as not to reduce significantly the overall stiffness of the image acquisition unit when mounted thereto and to the pointing mechanism. According to another aspect of the invention, this feature may be achieved by constructing the shield as a lightweight structure, having a very low weight and low inertia with respect to image acquisition unit when mounted thereto and to the pointing mechanism; in such cases the shield may be considered to be effectively decoupled from the rest of the imaging system, and does not significantly affect the stiffness characteristics thereof, or its stability. In either case, the stiffness of the system is sufficient to minimize any adverse effects of resonant frequencies being induced thereon in operation of the system. Another feature of at least some embodiments of the invention is that the imaging system may operate substantially exposed to the external environment (and does not need or have a radome or cover) and in free fluid communication therewith, without the need to be enclosed by a fairing or the like, for example when operating at high altitudes/low speeds, and the dynamic pressure applied to the system is relatively low. The imaging system may nevertheless still be mounted to a pod, and a suitable radome or protective cover may be provided for the take off and climbing phases, and has a retracted configuration during these phases that is smaller in volume than in the deployed configuration. In at least some embodiments, the imaging system may be discarded and not recovered.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
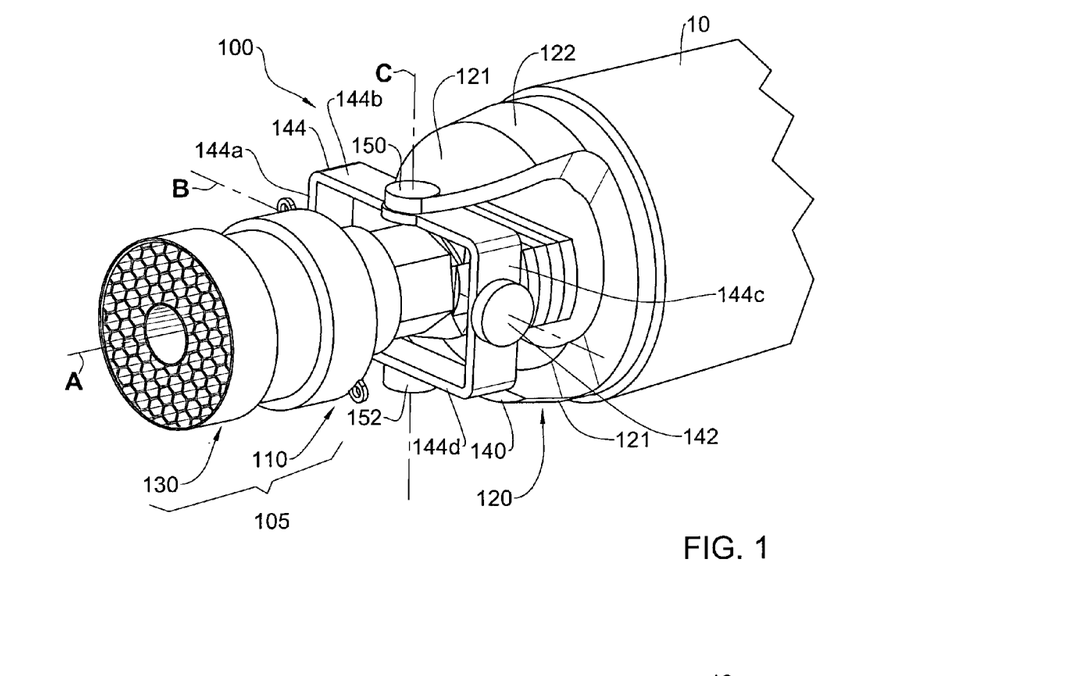
FIG. 1 illustrates in isometric front/side view a first embodiment of the system of the invention.
Figure 2:
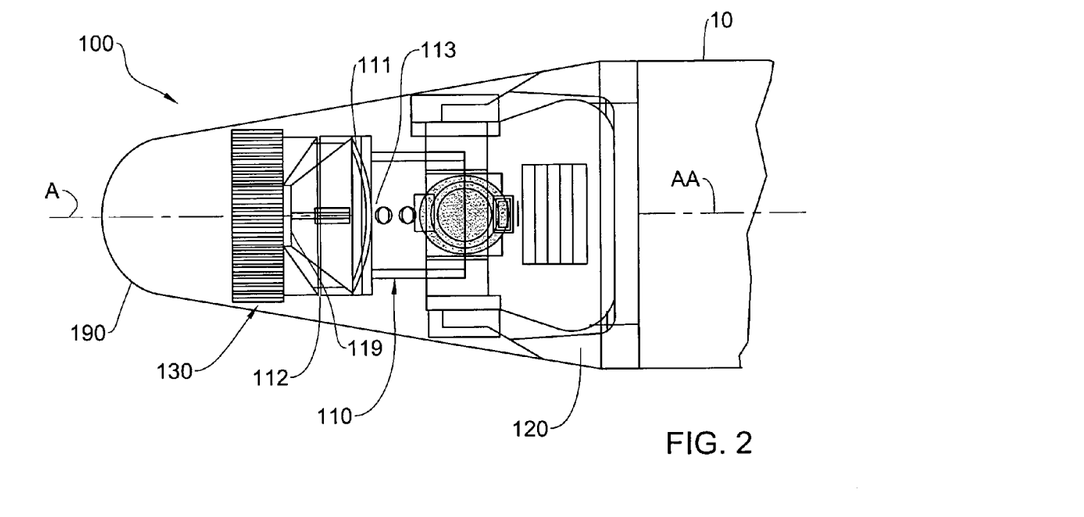
FIG. 2 illustrates in side view the embodiment of FIG. 1.

Referring to FIGS. 1 and 2, an optical imaging system according to a first embodiment of the invention, designated with reference numeral 100, comprises an image acquisition unit 110, a pointing mechanism 120 and an electromagnetic shield 130.

Image acquisition unit 110 comprises an optical axis A, and may comprise any suitable arrangement for obtaining images along axis A. These images may be still images (frames) acquired at selected points in time, and/or video images comprising for example a sequence of images over a period of time, and the image acquisition unit 110 may be configured for providing such images in the visible electromagnetic spectrum, and/or in the non-visible spectrum, for example infra red and/or ultraviolet. Additionally or alternatively, the image acquisition unit 110 may be configured for night vision.

The image acquisition unit 110 is generally configured for procuring such images in electronic/digital form, for storage and/or transmittal via suitable transmitting equipment to a desired location, as is known in the art. Alternatively, the image acquisition unit 110 may capture the images on photographic film, which can be retrieved for processing at a convenient time, for example after recovery of the system 100, or by suitably ejecting the film, for example enclosed in a capsule, by means of a suitable arrangement, as is known in the art.

In this and other embodiments, and referring to FIG. 2, the image acquisition unit 110 may comprise an optical magnification or telescope unit 119, comprising a parabolic mirror 111 that focuses incident electromagnetic radiation thereon (which is parallel to the optical axis A) towards a second mirror 112, which then directs and focuses the re-directed electromagnetic radiation (optionally via focusing optics, not shown) to an electromagnetic radiation sensitive target 113, such as for example a CCD, CMOS, or other electronic/digital recording device, or alternatively photographic film or the like, for generating an image corresponding to the electromagnetic radiation received.

The image acquisition unit 110 is pivotably mounted to pointing mechanism 120, which is configured for selectively pointing the optical axis A in any desired direction within an envelope. The desired direction is generally along a line of sight (LOS) which may be defined as the direction along an imaginary line joining the center of gravity of the assembly 105 (comprising the image acquisition unit 110 and electromagnetic shield 130) to the center of a target or area that it is desired to image by means of the system 100.

In the illustrated embodiment, the pointing mechanism 120 comprises a pan and tilt mechanism, including a base member 122, for rigidly mounting the pointing mechanism to a desired location, for example on a mobile or aerial platform such as for example an air vehicle, such as for example a UAV, via a pod 10 or the like, for example. The pointing mechanism 120 comprises a tilt gimbal 140 and a pan gimbal 150. The tilt gimbal 140 provides an axis of rotation B which extends through the center of gravity of the assembly 105.

It is to be noted that for variations of this embodiment, in which the shield 130 is retrofitted to an existing assembly of an image acquisition unit 110 and pointing mechanism 120, a suitable counterweight may be provided to the image acquisition unit 110 so that its original position for the center of gravity is maintained. In any case, at least for many applications of the system 100, it is better for the shield 130 to be made from lightweight materials, which nevertheless have mechanical integrity to withstand operation of the system as described herein, for example.

The tilt gimbal 140 comprises tilt bearings 142 aligned with axis B, and located on opposed members 144a, 144c of a generally parallelepiped frame 144. The image acquisition unit 110 is pivotably mounted to the pointing mechanism 120 via the tilt bearings 142. The pan gimbal 150 provides an axis of rotation C which also extends through the center of gravity of assembly 105, substantially orthogonal with respect to axis B, and comprises pan bearings 152 aligned with axis C. Pan bearings 152 are located at the ends of spaced arms 121 that project forwardly from base 122, and frame 144 is pivotably mounted to the pan gimbal 150 via pan bearings 152, via opposed members 144b, 144c of frame 144.

The pan gimbal 150 and tilt gimbal 140 each comprise, or are operatively coupled to, suitable motorized drive assemblies (not shown), for example stepper motors and gears, and so on, for selectively providing required rotations about the respective axes C and B, and a suitable controller (not shown) may be provided to limit the rotations about these axes to avoid collision between the assembly 105 and parts of the pointing mechanism 120, for example. Operation of the gimbals 140, 150 is controlled by the controller, which may comprise a preloaded program of operations, and/or a communications module (not shown) for controlling the gimbals from a remote location, for example.

Rotation of the assembly 105 about axis C provides an azimuth direction for optical axis A, while rotation of assembly 105 about axis B provides an elevation for optical axis A, and thus any suitable combinations of the two rotations enable the optical axis A to be pointed wherever required within a predetermined envelope or field of regard (FOR), the global extent of the FOR being determined by the actual position and orientation of the platform 10 onto which the system 100 is mounted, and the local extent of the FOR with respect to the system 100 being determined by the need to avoid of collision between the assembly 105 and the pointing mechanism 120.

Electromagnetic shield 130 is suitably mounted to image acquisition unit 110, and is configured for shielding the image acquisition unit 110 from receiving unwanted electromagnetic radiation originating in at least one direction different from the LOS, in particular from one or more directions, each inclined at an angle not less than a shielding angle $\alpha$ to the optical axis A. In other words, the electromagnetic shield 130 substantially prevents electromagnetic radiation originating in a direction at or greater than a desired angle $\alpha$ to the optical axis A to reach the image acquisition unit 110, when the axis is being pointed at a target, for example.

Figure 3:
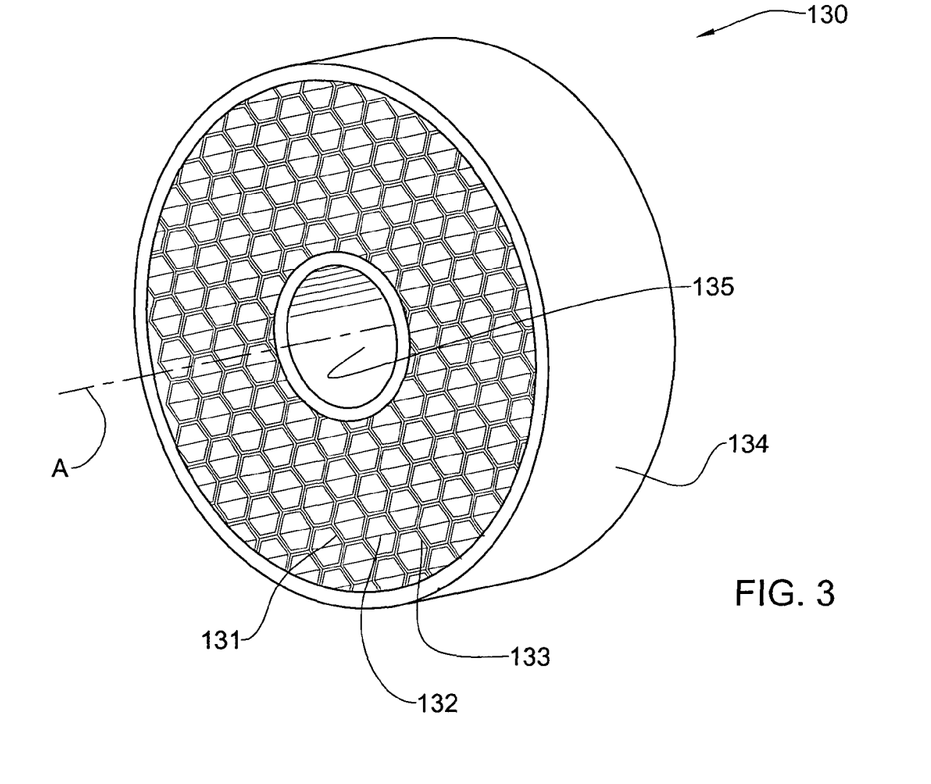
FIG. 3 illustrates the shield of the embodiment of FIG. 1.

In this embodiment, and referring also to FIG. 3, the shielding is provided by matrix 131 comprising a plurality of hexagonal cells 132 in honeycomb arrangement, each cell being in contact with up to another six cells or portions thereof via common walls 133. The cells 132 are nominally of uniform height and width in this embodiment, though some cells in the periphery of the matrix may be incomplete, and thus deficient in width. Optionally, in other variations of this embodiment, different cells may have different heights and/or widths.

Referring also to FIG. 3, the shield 130 is a relatively rigid component, having low weight and inertia relative to the image acquisition unit 110, and preferably also has a relatively low aerodynamic drag moment, at relatively low air speeds and/or low air densities. In particular, the shield 130 is constructed such that the structural rigidity of the shield is sufficient so as not to reduce significantly the overall stiffness of the image acquisition unit when mounted thereto and to the pointing mechanism. The stiffness of the system is thus sufficient to minimize any adverse effects of resonant frequencies being induced thereon in operation of the system.

The matrix 131 is contained in an annular casing comprising an outer cylindrical wall 134 substantially co-axial with optical axis A, and concentric inner cylindrical wall 135, which corresponds to the mirror 112.

Figure 4:
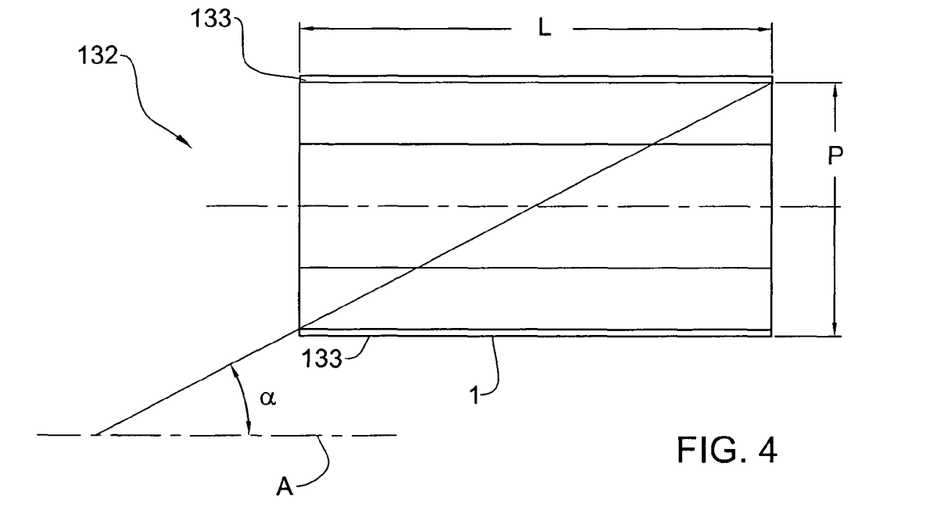
FIG. 4 illustrates dimensional relationships of a cell of the shield of FIG. 3.

Referring also to FIG. 4, each cell 132 has an aperture P, substantially orthogonal to axis A, and a length L substantially along axis A, wherein the ratio P/L defines angle α(=arc tan(P/L)). The aperture P may be defined, for example, as the maximum width of the cell 132, or as an equivalent diameter D, wherein D=√[4*T/π], wherein T is the cross-sectional area of the cell along a plane orthogonal to axis A. It is clear that electromagnetic radiation incident to the shield 130 at an angle greater than angle α will not reach the image acquisition unit 110, but rather will impinge on walls 133, which are coated or are made from a light absorbent material. For example, walls 133 may be painted in black, when it is required to obtain images in the visible spectrum, or made from a ceramic material or other material that minimizes heat reflection, when it is required to obtain images in the infra red spectrum.

Thus, each cell acts as a separate shield for a different part of the area being imaged by the system 100.

In a variation of this embodiment, the hexagonal cells 132 may be replaced with tubular cells, or with prismatic cells having any required cross-section, in close packed configuration.

Optionally, and in other variations of this embodiment, the cells need not all have the same cross-section, but should have at least the same maximum relationship of the ratio of cell aperture to cell length (that defines angle α), and at least some such cells may further optionally comprise a cell aperture to cell length ratio that is less than this maximum, thereby still ensuring that electromagnetic radiation at an angle greater than angle α to axis A is still shielded with respect to the image acquisition unit 110.

Figure 5:
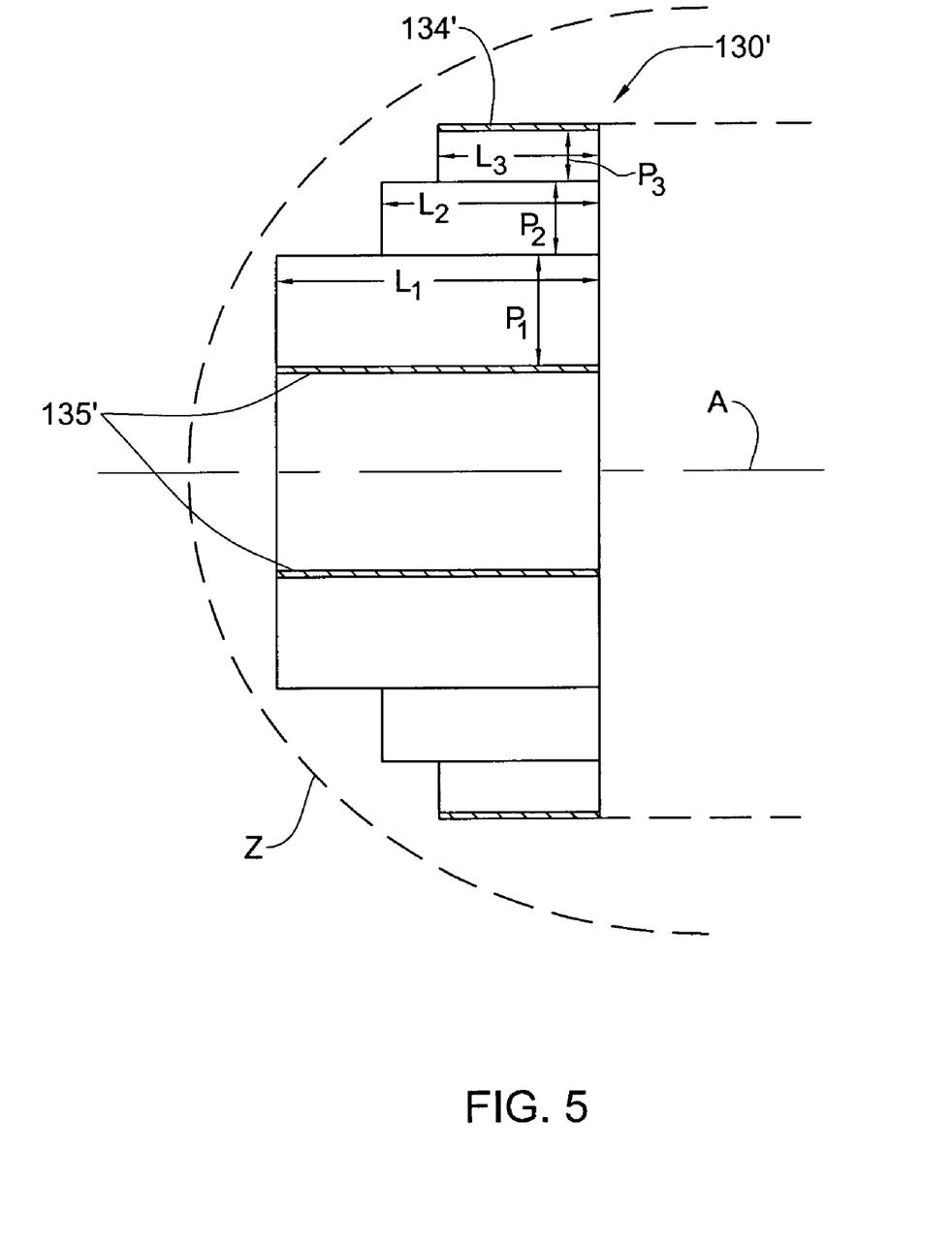
FIG. 5 illustrates in side view an alternative embodiment for the shield of FIG. 3.

In another variation of this embodiment, and referring to FIG. 5, electromagnetic shield 130', substantially similar to electromagnetic shield 130, mutatis mutandis, differs therefrom in that concentric walls 134', 135' of the annular casing comprise three sets of cells in concentric relationship with respect to axis A. The innermost set of cells has a relatively large length $L_1$ and aperture $P_1$, the next, intermediate set of cells has a smaller length $L_2$ and aperture $P_2$, and the outermost set of cells having the smallest length $L_3$ and aperture $P_3$. Of course, there may be a greater or lesser number of sets, in any case each set of cells having a length and aperture that increases in a radial direction towards the axis A with respect to a set more distanced from the axis A. However, the aperture to length relationship of each of the cells in all the sets conforms to a maximum relationship (that defines the desired angle α), and optionally may be set to such a maximum value, such that electromagnetic radiation at an angle greater than that provided by this ratio is shielded from the image acquisition unit 110. Such a configuration may be useful, for example, when the shield 130' is required to be housed in, and/or moved within, an envelope Z which would for example not be able to include the shield having a uniform length of $L_1$. Of course, there may be more than or less than three sets of cells, and may be arranged in any desired configuration to best fit a predetermined envelope.

In one application of the system 100 according to the first embodiment, the system 100 is carried externally on an air vehicle, for example an unmanned air vehicle (UAV), but in other applications may include instead any suitable manned vehicle. For example, the system 100 may be mounted onto a pod 10, carried on or otherwise affixed to an external part of such an unmanned or manned air vehicle. In general, the system 100 may further comprise a radome or cover 190 (FIG. 2) which protects the system from the external environment, at least when the vehicle is operating at high speed and/or low altitude, when dynamic forces may be highest for a UAV or other aircraft, for example. In some variations of this embodiment, the cover 190 is of a size and shape that allows movement of the assembly 105 about the full envelope referred to above, and moreover is transparent to the electromagnetic radiation that the image acquisition unit 110 is designed to monitor. In other variations of this embodiment, the cover 190 is of a size and shape that minimizes drag, for example being just sufficiently large as to accommodate the system 100 when axis A is aligned within the longitudinal axis AA of the pod 10, but would not otherwise allow movement of the assembly 105 within the cover, which is ejected at predetermined conditions to allow operation of the system 100. Such conditions may comprise, for example a maximum dynamic pressure corresponding to a predetermined speed/height envelope for the pod 10 and carrier air vehicle or craft, the dynamic pressure then being sufficiently low to prevent inducing large forces or vibrations to the system 100 when exposed thereto.

In operation of the system 100, the system 100 may be mounted onto a pod 10 or otherwise to a UAV, for example. When the UAV reaches a particular surveillance altitude and loiter speed, the cover 190 is ejected, and the system may be pointed in any desired direction to obtain desired images along a LOS. The UAV may be maneuvered to provide relatively large changes in the direction of axis A, and fine tuning of the direction thereof to align the LOS may be obtained by means of the pointing mechanism 120. Alternatively, the pointing mechanism 120 may be used exclusively for pointing the axis A in a desired direction, for example by suitably rotating the assembly 105 about axes B and/or C, while the UAV is traveling in a particular course, so long as the required motion of the pointing system 120 is within the aforesaid motion envelope (FOR). In image acquisition mode for the system 100, it may be desired to obtain images of a target, for example a moving aircraft, which in relation to the system 100 is relatively close to an intense electromagnetic source, for example the sun, moon (at night) or an array of floodlights. Accordingly, axis A is aligned with the target while maintaining an angle between the electromagnetic source and axis A greater than angle α, enabling the target to be suitably and safely imaged, while preventing or at least minimizing overexposure or over saturation effects on the image acquisition unit 110, enabling surveillance of the target to continue indefinitely until the target moves angularly closer to the electromagnetic source with respect to the optical axis A of the system 100.

In some applications of this and other embodiments disclosed herein, the desired shielding angle α may be set at about 60°.

In some applications of this and other embodiments disclosed herein, the desired shielding angle α may be set at 45°, or at any suitable angle between about 60° and about 45°.

In some applications of this and other embodiments disclosed herein, the desired shielding angle α may be set at about 30° or at any suitable angle between about 45° and about 30°.

In some applications of this and other embodiments disclosed herein, the desired shielding angle α may be set at about 20°, or at any suitable angle between about 30° and about 20°.

In some applications of this and other embodiments disclosed herein, the desired shielding angle α may be set at about 10°, or at any suitable angle between about 20° and about 10°.

In some applications of this and other embodiments disclosed herein, the desired shielding angle α may be set at about 5°, or at any suitable angle between about 10° and about 5° or less than about 5°.

Figure 6:
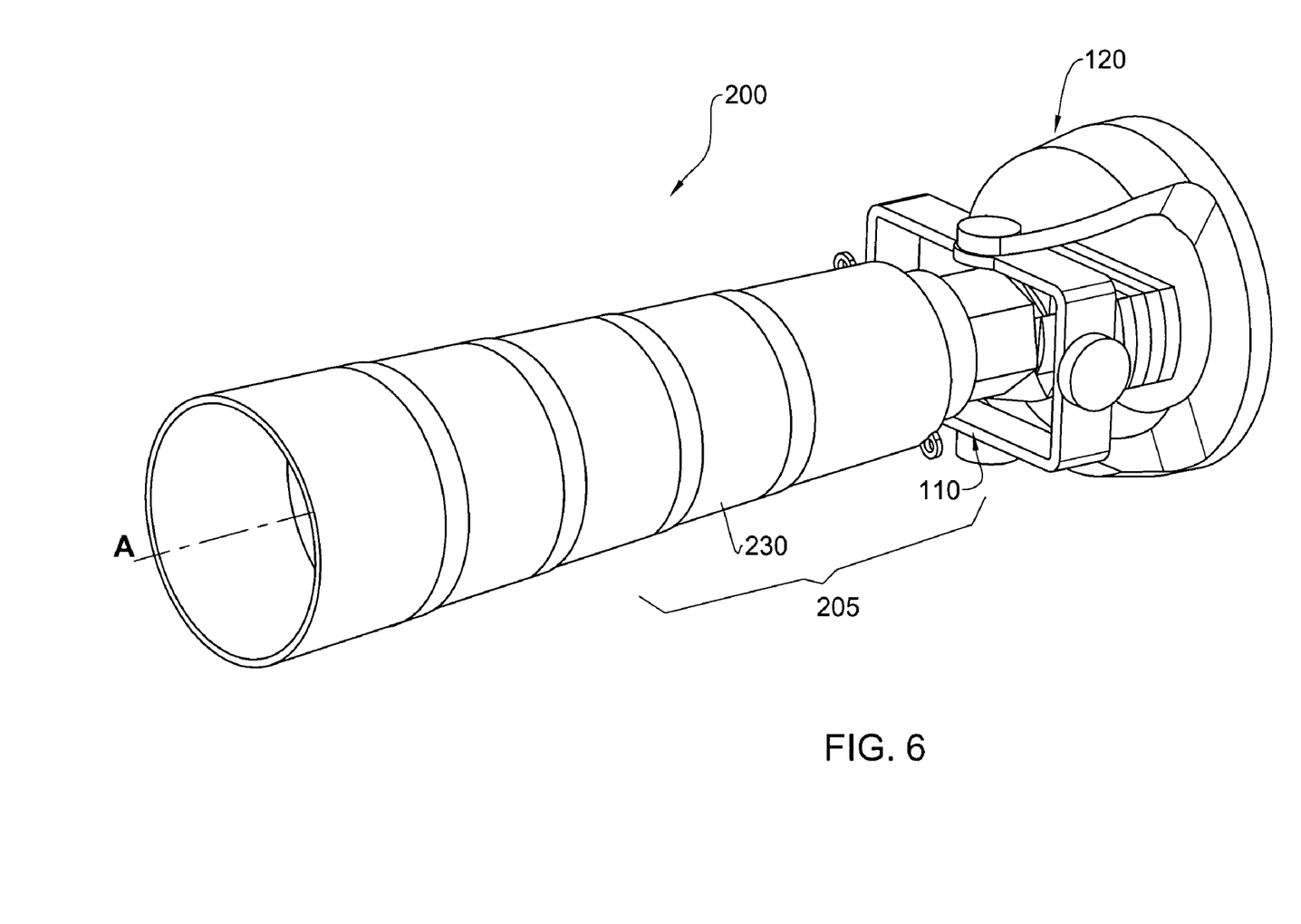
FIG. 6 illustrates in isometric front/side view a second embodiment of the system of the invention.
Figure 7:
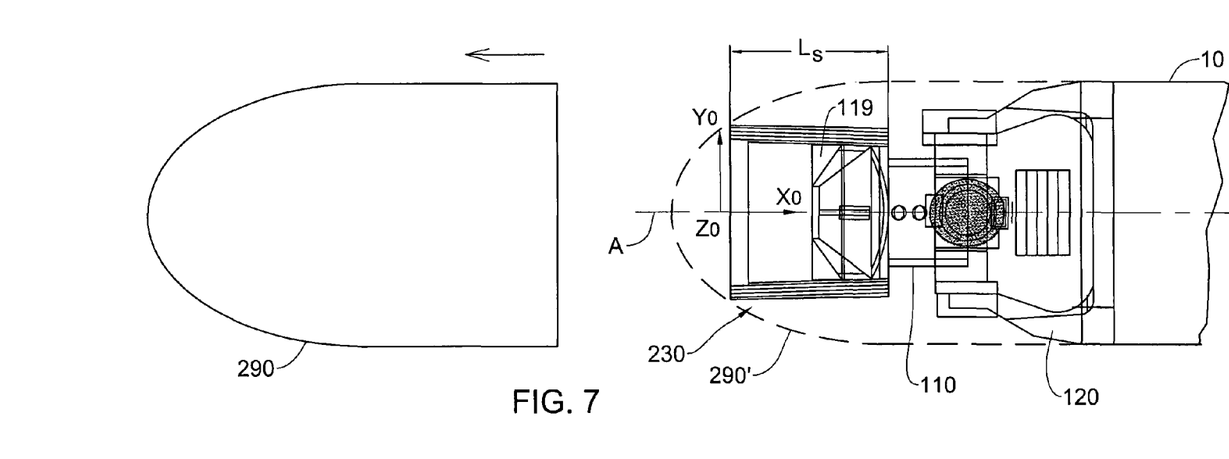
FIG. 7 illustrates in side view the embodiment of FIG. 6 in stowed configuration.
Figure 8:
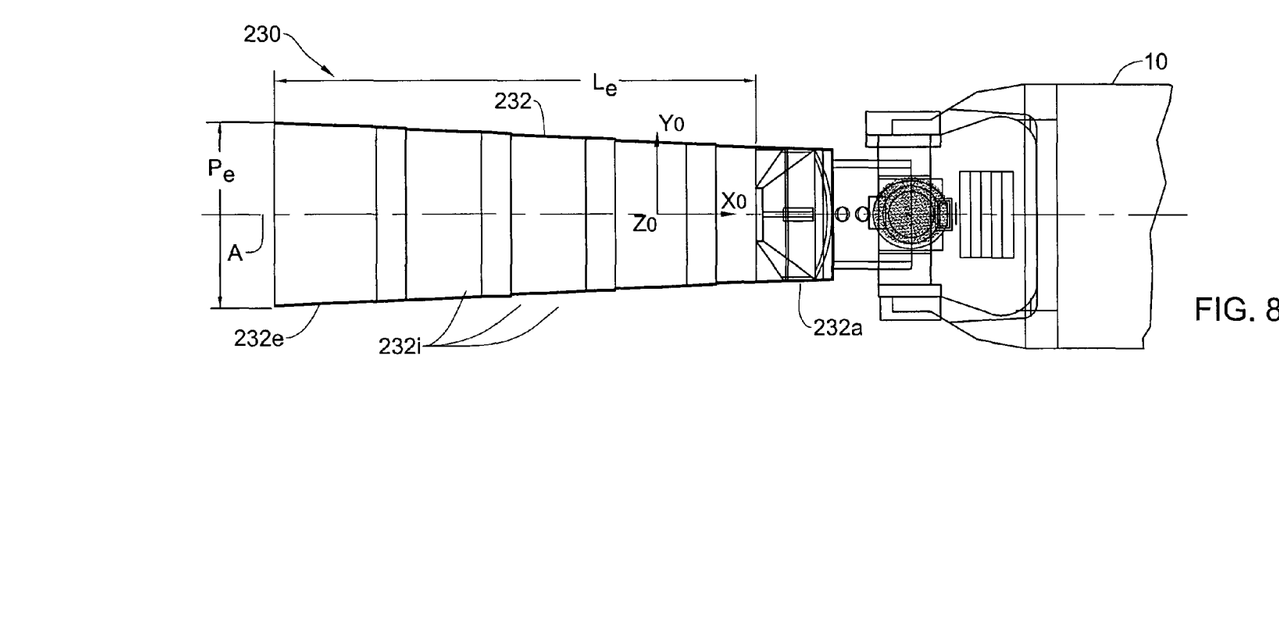
FIG. 8 illustrates in side view the embodiment of FIG. 6 in deployed configuration.

Referring to FIGS. 6 to 8, the system 200 according to a second embodiment of the invention comprises all the elements and features of the first embodiment, mutatis mutandis, and thus also comprises image acquisition unit 110 and pointing mechanism 120 as described for the first embodiment, mutatis mutandis. However, in the second embodiment, rather than providing an electromagnetic shield 130 comprising a plurality of cells, electromagnetic shield 230 is instead provided, mounted to the image acquisition unit 110, to form assembly 205.

As with other embodiments of the invention, shield 230 is deployable between a stowed configuration illustrated in FIG. 7 and a deployed configuration illustrated in FIGS. 6 and 8. The shield 230 comprises a plurality of telescopic elements or segments 232, including a base segment 232b, an end segment 232e, and a plurality of intermediate segments 232i. The segments 232 may be substantially tubular, or any other suitable shape, and are generally similar in form to one another, but of a general size (diameter or other dimension orthogonal to the axis A) that generally increases from the base segment, through the intermediate segments 232i, to the end segment 22e. Base segment 232b is configured for being fixed to the image acquisition unit 110, for example to the telescope unit 119, the forward end thereof is configured for enabling an adjacent intermediate segment 232i to slide over the base segment 232b from a substantially overlying or nested position (FIG. 7), to the extended position (FIG. 8) where an aft end of the intermediate segment cooperates and locks with the end segment 232e. In a similar manner, mutatis mutandis, each of the intermediate segments 232i has a forward end configured for enabling an adjacent intermediate segment 232i to slide over the intermediate segment 232i (or for the foremost intermediate segment, for allowing the end segment 232e to slide over that intermediate segment) from a substantially overlying or nested position (FIG. 7), to the extended position (FIG. 8), and an aft end of the end segment 232e and of each of these intermediate segment cooperates and locks with the previous intermediate segment 232i. Such locking between adjacent segments 232 may be achieved, for example, by friction between the segments 232, which may comprise a frusto-conical shape enabling a wedge fit between the segments.

Thus, segments 232 are slidable from stowed configuration, in which the segments are nested in a compact form, in which the shield has a compact length $L_s$, overlaying at least a portion of the image acquisition unit 110, to the deployed configuration, in which adjacent segments 232 are interconnected and extended with respect to one another, to provide an extended length $L_e$ to the shield 230, from the forward plane 118 of the image acquisition unit 110 to the forward end of the shield 230. The shield provides an aperture $P_e$, substantially the diameter of the telescope unit 119 or of the outer edge of the end segment 232e, and the ratio $P_e/L_e$ provides the shielding angle α, so that any electromagnetic source at an angle greater than angle α to the optical axis A is shielded from the image acquisition unity 110.

As for the first embodiment, the system 200 may be mounted to a pod 10 or the like, or within the fuselage or wings, for example, of an aircraft such as a UAV, for example, and may further comprise a cover 290 for protecting the system 200 during parts of the operation, for example as described for the first embodiment, mutatis mutandis. In this embodiment, the cover 290 may be ejected from its mounted position (indicated by the dotted lines at 290') with respect to the pod 10 or the like when the dynamic pressure of the outside environment is below acceptable values for the system 200. The cover 290 may be in the form of an aerodynamic fairing, for example cone-shaped, to minimize drag at least prior to ejection.

Deployment of the shield 230 to the deployed configuration may be carried out in a number of ways. For example, the end segment 232e may be temporarily connected to the cover 290, so that as the cover is ejected, it draws out the end segment 232e, and entrained therewith, the intermediate segments 232i. The connection may comprise a shear pin or clutch or the like, configured to disengage when there is a resistance for further movement by the end segment 232e, i.e., when the segments are fully extended.

The shield 230 is a relatively rigid component, having low weight and inertia relative to the image acquisition unit 110, for example Kevlar, graphite epoxy and so on, and preferably also has a relatively low aerodynamic drag moment at relatively low air speeds and/or low air densities. Vents (not shown) may be provided on or near the rear end of the shield 230 for allowing air funneled into the shield due to the motion of the carrier air vehicle to escape from the shield, and thus minimize flutter or mechanical stresses to the shield. At least the inside of the shield 230 is coated or otherwise made from a material that is non-reflective or minimizes reflectance of electromagnetic radiation, at least of the wavelength(s) being imaged by the system 200.

Operation of system 200 is similar to that described for the first embodiment mutatis mutandis.

Figure 9:
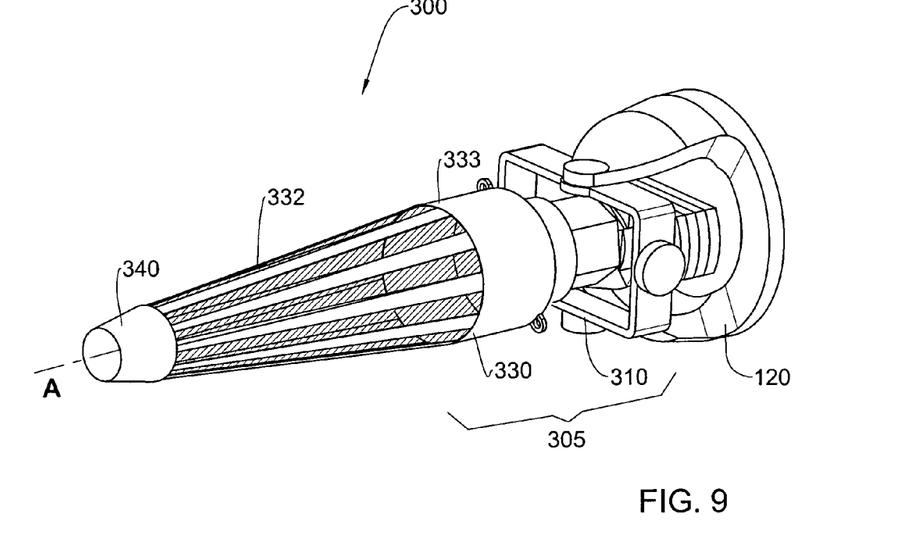
FIG. 9 illustrates in isometric front/side view a third embodiment of the system of the invention in stowed configuration.
Figure 10:
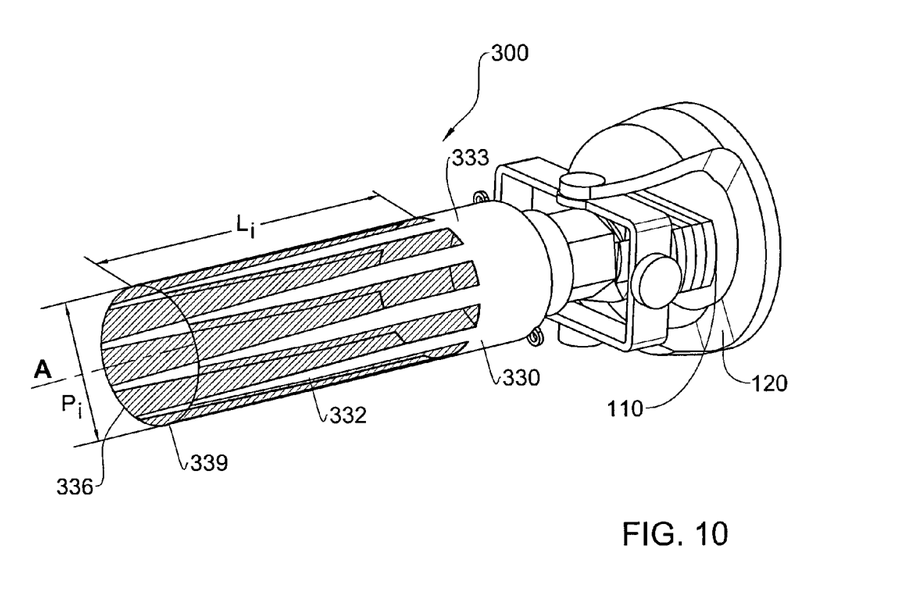
FIG. 10 illustrates in isometric front/side view the embodiment of FIG. 9 in deployed configuration.
Figure 11:
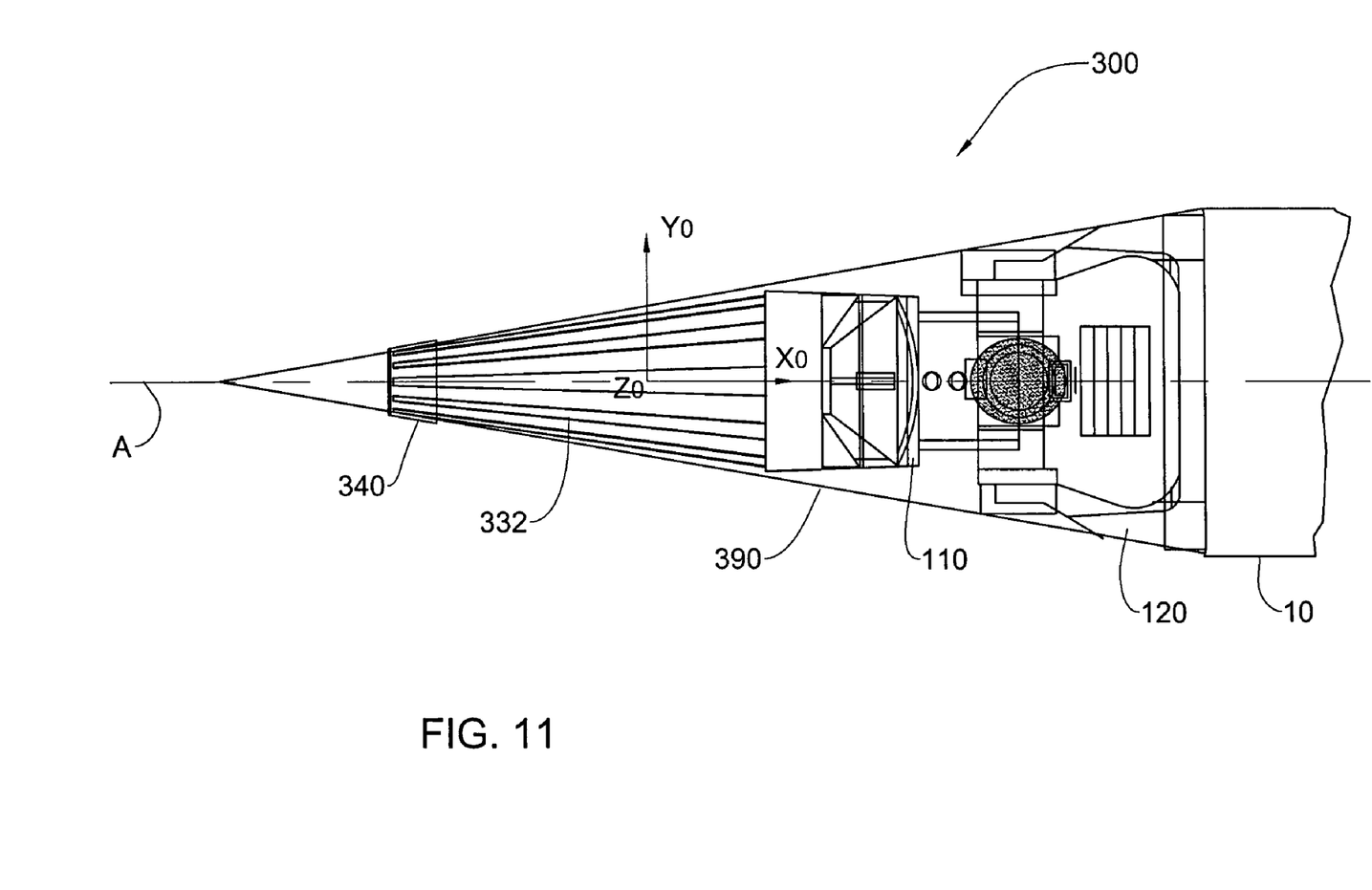
FIG. 11 illustrates in side view the embodiment of FIG. 9 in stowed configuration.

Referring to FIGS. 9 to 11, the system 300 according to a third embodiment of the invention comprises all the elements and features of the first and second embodiments, mutatis mutandis, and thus also comprises image acquisition unit 110 and pointing mechanism 120 as described for the first and second embodiments, mutatis mutandis. However, in the third embodiment, deployable electromagnetic shield 330 is provided, mounted to the image acquisition unit 110, to form assembly 305. In this embodiment, the electromagnetic shield 330 is deployable between a stowed configuration illustrated in FIGS. 9 and 11, and a deployed configuration illustrated in FIG. 10. The shield 330 comprises a plurality of resilient strut elements 332 arranged around the circumference of a base member 333, and adjacent strut elements 332 are spaced one from another along the circumference. The base member 333 is configured for being fixed to the image acquisition unit 110, for example to the telescope unit 119. The strut elements 332 project in a general forward direction from the forward end of the base member 333, and in the stowed configuration are stressed and bendably deformed such that the forward ends 339 of the strut elements 332 are radially brought into proximity with the optical axis, storing potential energy. A collapsible material, in the form of for example a foil, sheet, etc., is provided, at least between each pair of adjacent strut elements 332, or alternatively as a continuous, generally tubular element 336 attached to the strut elements 332. The ends 339 may be kept in the stressed stowed configuration by means of a plug member 340 that traps the ends 339 there. When the plug member 340 is removed the stored energy in the strut elements 332 springs the strut elements 332 radially outwards, this motion being restricted by the tubular element 336, which is then kept in a taut state by means of the residual stored potential energy in the strut elements 332. Accordingly, it may be preferably to configure the strut elements 332 such that their neutrally stressed state is one where the strut elements 332 are radially spaced from the optical axis A further than allowed by the tubular element 336.

In the deployed configuration illustrated in FIG. 10, the shield 330 provides an aperture $P_i$, substantially the diameter of the telescope unit 119 or of the inner edge of the base member 333, and a length $L_i$, from the forward plane 118 of the image acquisition unit 110 to the forward end of the shield 330, and the ratio $P_i/L_i$ provides the shielding angle α, so that the image acquisition unity 110 is shielded from any electromagnetic source at an angle greater than angle α to the optical axis A.

As for the first and second embodiments, mutatis mutandis, the system 300 may also be mounted to a pod 10 or the like, and may further comprise a cover 390 for protecting the system 300 during parts of the operation of the system 300, for example as described for the first embodiment, mutatis mutandis, and in a similar manner thereto, the cover 390 may be ejected from its mounted position with respect to the pod 10 or the like when the dynamic pressure of the outside environment is below acceptable values for the system 300. Thus, the stowed configuration for the shield 330 has a relatively compact form, enabling the same to be enclosed in an aerodynamic fairing such as a cone.

Deployment of the shield 330 to the deployed configuration may be carried out in a number of ways. For example, the plug member 340 may be connected to the cover 390, so that as the cover is ejected, it also removes the plug member 340, releasing the ends 339 of the strut elements 332, and allowing the same to spring back to a position in which the tubular element 336 is fully opened to a taut state.

The strut elements 332 may be made from suitable lightweight materials, for example Kevlar or graphite epoxy, and the tubular element 336 may be made from lightweight textile or plastic sheet, metallic foil, graphite epoxy sheet, and so on, and at least the inside of the shield 330 is coated or otherwise made from a material that is non-reflective or minimizes reflectance of electromagnetic radiation, at least of the wavelength(s) being imaged by the system 300.

When deployed, the shield 330 is a relatively rigid component, having low weight and inertia relative to the image acquisition unit 110, and preferably also has a relatively low aerodynamic drag moment at relatively low air speeds and/or low air densities.

Operation of system 300 is similar to that described for the first and second embodiments, mutatis mutandis.

Figure 12:
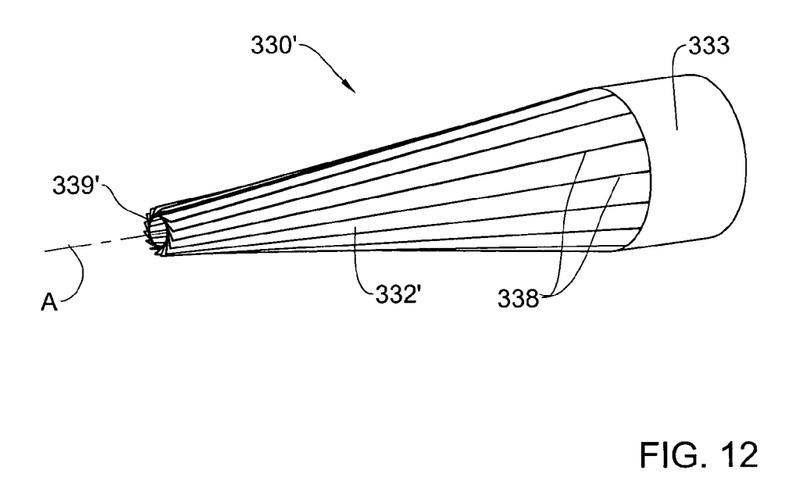
FIG. 12 illustrates in side view a variation of the embodiment for the shield of FIG. 9, in stowed configuration.
Figure 13:
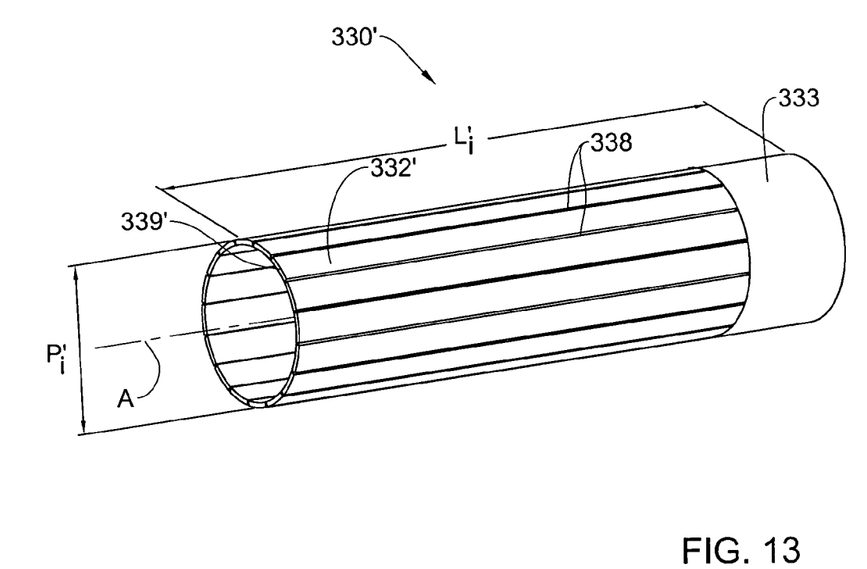
FIG. 13 illustrates in side view a variation of the embodiment for the shield of FIG. 9, in deployed configuration.

Referring to FIGS. 12 and 13, a variation of the third embodiment is illustrated. In this embodiment, the deployable electromagnetic shield, designated 330' is provided, and is in the form of a spring energized slotted tube. The shield 330' is mounted to the image acquisition unit 110, to form assembly similar to assembly 305, mutatis mutandis, and the electromagnetic shield 330' is deployable between a stowed configuration illustrated in FIG. 12, and a deployed configuration illustrated in FIG. 13. The shield 330' also comprises a plurality of resilient strut elements 332' arranged around the circumference of a base member 333', which is configured for being fixed to the image acquisition unit 110, for example to the telescope unit 119. The strut elements 332' are juxtaposed circumferentially, each being abutting or in close proximity to the strut elements 332' adjacent thereto, and project in a general forward direction from the forward end of the base member 333'. The strut elements 332 are thus in the form of strips having longitudinal edges 338, ends 339' and curved transverse section, so that when the longitudinal edges 338 of adjacent strut elements 332' are in contact or close proximity in the deployed configuration, the strut elements 332' provide a substantially contiguous cylindrical or frusto-conical body, as illustrated in FIG. 13, for example, without the need for material to be provided between adjacent struts in the deployed configuration. In the stowed configuration shown in FIG. 12, the strut elements 332' are stressed and deformed such that the forward ends 339 of the strut elements 332 are radially brought into proximity with the optical axis, and at the same time the elements 332 are twisted so that the ends 339' are rotated with respect to the ends thereof at the base member 336. Thus, each of the ends 339' is partially interleaved with adjacent ends 339'. The bending and torsion on the strut elements 332' results in potential energy being stored therein. The ends 339' may be kept in the stowed configuration by means of a plug member (not shown), similar to that of the embodiment of FIGS. 9 to 11, for example, and when the plug member is removed the stored energy in the strut elements 332' springs the strut elements 332 radially outwards, until the elements 332' resume their neutral stressed condition illustrated in FIG. 13, where the ends 339' of the strut elements 332' are radially spaced from the optical axis A and the strut elements 332' form a substantially contiguous cylindrical or frusto-conical body.

In the deployed configuration illustrated in FIG. 13, the shield 330' provides an aperture $P_i'$, substantially the diameter of the telescope unit 119 or of the inner edge of the base member 333', and a length $L_i'$, from the forward plane 118 of the image acquisition unit 110 to the forward end of the shield 330', and the ratio $P_i'/L_i'$ provides the shielding angle α, so that the image acquisition unity 110 is shielded from any electromagnetic source at an angle greater than angle α to the optical axis A.

As with the embodiment of FIGS. 9 to 11, in the stowed configuration the shield 330' is also relatively compact and also enables the same to be enclosed in an aerodynamic fairing such as a cone, and deployment and operation of the shield 330' is as described for shield 330, mutatis mutandis. The strut elements 332' may be made from suitable lightweight materials, for example Kevlar, graphite epoxy, metals (including for example aluminium, titanium, and so on), and at least the inside of the shield 330' is coated or otherwise made from a material that is non-reflective or minimizes reflectance of electromagnetic radiation, at least of the wavelength(s) being imaged by the system 300.

When deployed, the shield 330' is a relatively rigid component, having low weight and inertia relative to the image acquisition unit 110, and preferably also has a relatively low aerodynamic drag moment at relatively low air speeds and/or low air densities.

Figure 14:
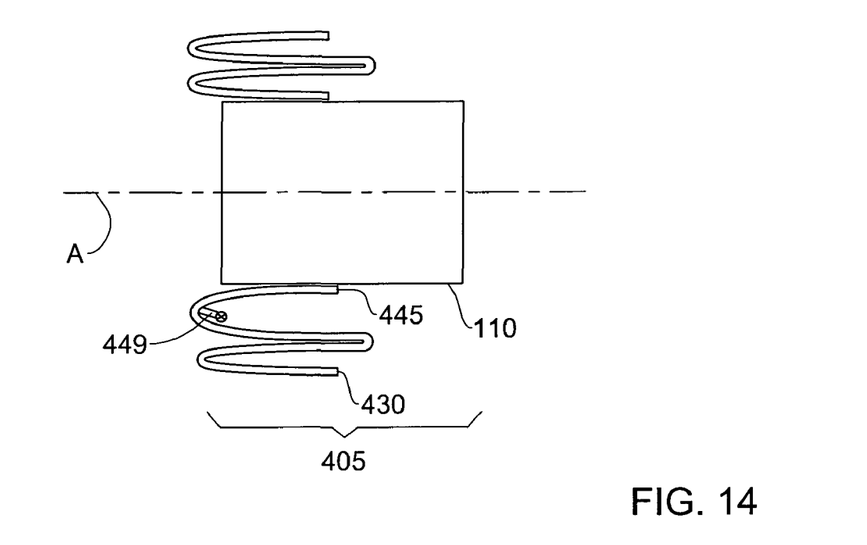
FIG. 14 illustrates in side view a fourth embodiment of the system of the invention in stowed configuration.
Figure 15:
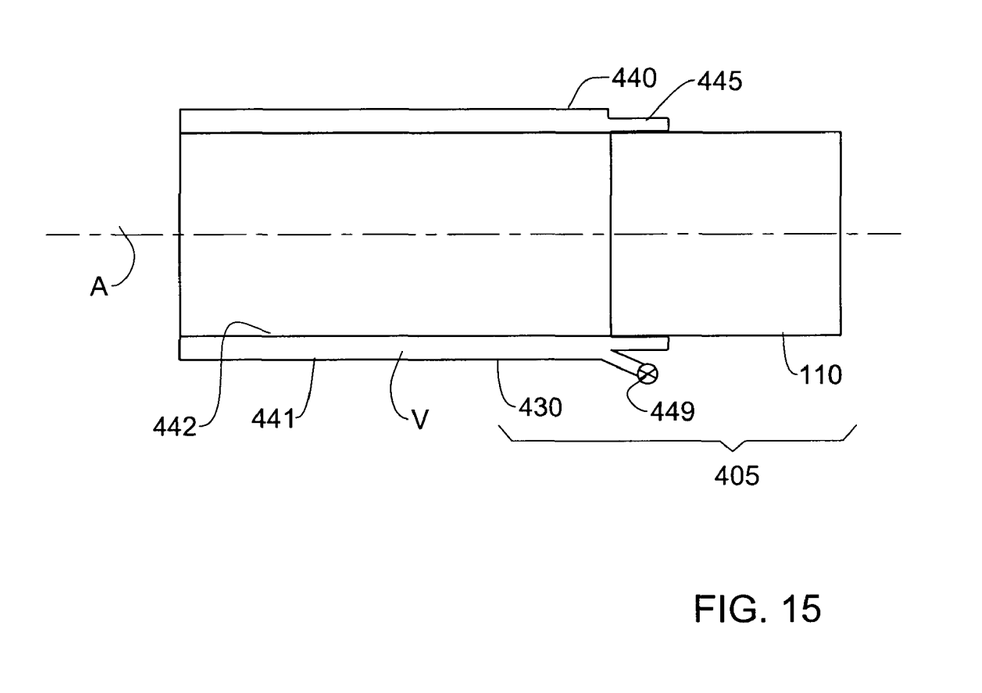
FIG. 15 illustrates in side view the embodiment of FIG. 14 in deployed configuration.

Referring to FIGS. 14 and 15, the system according to a fourth embodiment of the invention comprises all the elements and features of the first to third embodiments, mutatis mutandis, and thus also comprises image acquisition unit 110 and pointing mechanism 120 as described for these embodiments, mutatis mutandis. However, in the fourth embodiment, an inflatably deployable electromagnetic shield 430 is provided, mounted to the image acquisition unit 110, to form assembly 405. In this embodiment, the electromagnetic shield 430 is deployable between a deflated stowed configuration illustrated in FIG. 14, and an inflated deployed configuration illustrated in FIG. 15. The shield 430 is in the form of a double-walled inflatable tubular member 440, defining an inflatable volume V in-between outer cylindrical wall 441 and inner cylindrical wall 442. The member 440 is attached to the image acquisition unit 110 in any suitable manner, for example, via a clamping band 445. The member 440 comprises an inflation port 449, in fluid connection with a pressurized fluid source (not shown), such as for example compressed air or other gas, via a controllable valve. In one variation of this embodiment, a gas or mixture of gases is chosen having a density such that when the member 440 is fully inflated it is in neutral buoyancy with the surrounding environment.

In the uninflated stowed configuration illustrated in FIG. 14, the member 440 may be folded over itself once or a number of times, providing a compact configuration, and may be enclosed in an aerodynamic fairing such as a cone, for example, in a similar manner to that described for other embodiment, for example, and the shield 430 may be deployed when desired by ejecting the fairing and inflating the member 440 by means of the pressurized fluid source.

The member 440 may be made from suitable lightweight impervious materials, for example sealed graphite epoxy sheet, rubber, silicone or plastic, and at least the inner wall 442 is coated or otherwise made from a material that is non-reflective or minimizes reflectance of electromagnetic radiation, at least of the wavelength(s) being imaged by the system.

When deployed, the shield 430 is a relatively rigid component, having low weight and inertia relative to the image acquisition unit 110, and preferably also has a relatively low aerodynamic drag moment at relatively low air speeds and/or low air densities.

In the second, third and fourth embodiments, the electromagnetic shield is configured and constructed as a lightweight structure, having a very low weight and low inertia with respect to image acquisition unit when mounted thereto and to the pointing mechanism, such that the shield is effectively decoupled from the rest of the imaging system, and does not significantly affect the stiffness characteristics thereof, or its stability. The stiffness of the system is thus sufficient to minimize any adverse effects of resonant frequencies being induced thereon in operation of the system.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed example embodiments in accordance with the invention, it will be appreciated that many changes may be made therein without departing from the spirit of the invention.

The invention claimed is:

1. An optical imaging system for an air vehicle, comprising an image acquisition unit, a pointing mechanism and an optical shield, said image acquisition unit having an optical axis and configured for providing images in a direction along said axis, said image acquisition unit being mounted to said pointing mechanism, said pointing mechanism being configured for selectively pointing said optical axis in a desired direction, and said optical shield being mounted to said image acquisition system and configured for shielding said image acquisition unit from receiving undesired electromagnetic radiation from at least one direction inclined at an angle not less than a shielding angle to the optical axis, wherein said optical shield is configured for avoiding significantly reducing the overall stiffness of said image acquisition unit when mounted thereto.

2. System according to claim 1, wherein said shield comprises a plurality of cells, each cell having a central axis thereof substantially parallel to said optical axis, and wherein each said cell has an aperture to length ratio not less than that corresponding to said shielding angle.

3. System according to claim 2, wherein said cells are hexagonal cells in honeycomb arrangement.

4. System according to claim 2, wherein said cells are of substantially the same size and shape one to another.

5. System according to claim 2, wherein said cells are made from, or comprise a coating made from, a material that is substantially not reflective, at least with respect to said undesired electromagnetic radiation.

6. System according to claim 2, further comprising an optical magnification unit optically located between said optical shield and said image acquisition unit.

7. System according to claim 6, wherein said optical magnification system comprises a first mirror configured for focusing incident electromagnetic radiation thereon that is parallel to the optical axis towards a second mirror that is configured for directing and focusing the re-directed electromagnetic radiation to an electromagnetic radiation sensitive target of said image acquisition unit.

8. System according to claim 1, wherein said system has a stiffness sufficient to minimize adverse effects of resonant frequencies that may be induced thereon in operation of the system.

9. System according to claim 1, wherein said pointing mechanism comprises a base adapted for mounting the system to the airborne platform or the like, a bracket for mounting said image acquisition unit thereto, and a suitable pan and tilt mechanism for enabling the bracket to be positioned in any desired orientation with respect to said base.

10. System according to claim 9, wherein said pan and tilt mechanism comprises a pan gimbal and a tilt gimbal for enabling the optical axis to be pointed along any desired azimuth and elevation within a predetermined field of regard.

11. System according to claim 10, wherein said pan and tilt mechanism is a stabilized pan and tilt mechanism.

12. System according to claim 1, wherein said image acquisition unit is configured for obtaining images in at least the infra-red spectrum.

13. System according to claim 1, further comprising an aerodynamically contoured cover configured for enclosing said system and for being substantially transparent to a range of wavelengths to be detected by said image acquisition unit.

14. System according to claim 1, wherein said system is adapted for pointing said optical system along a line of sight that is angularly displaced from a source of said undesired electromagnetic radiation such that said optical shield shields said image acquisition unit from receiving said undesired electromagnetic radiation originating from said source.

15. System according to claim 14, wherein said source is any one of the sun, moon or an array of floodlights, and said system is operatively connected to a suitable detector that is configured for determining the location of said source relative to said system.

16. System according to claim 1, further comprising a pod onto which said system is mounted, said pod being configured for being mounted onto the air vehicle.

17. An air vehicle comprising a system as defined in claim 1.

18. Air vehicle according to claim 17, wherein said air vehicle is a UAV.

19. An optical imaging system for an air vehicle, comprising an image acquisition unit, a pointing mechanism and an optical shield, said image acquisition unit having an optical axis and configured for providing images in a direction along said axis, said image acquisition unit being mounted to said pointing mechanism, said pointing mechanism being configured for selectively pointing said optical axis in a desired direction, and said optical shield being mounted to said image acquisition system and configured for shielding said image acquisition unit from receiving undesired electromagnetic radiation from at least one direction inclined at an angle not less than a shielding angle to the optical axis, wherein said optical shield is configured for avoiding significantly reducing the overall stiffness of said image acquisition unit when mounted thereto, and wherein said optical shield is a relatively rigid component, having a weight and an inertia that are low relative to a weight and an inertia, respectively, of said image acquisition unit.

20. An optical imaging system for an air vehicle, comprising an image acquisition unit, a pointing mechanism and an optical shield, said image acquisition unit having an optical axis and configured for providing images in a direction along said axis, said image acquisition unit being mounted to said pointing mechanism, said pointing mechanism being configured for selectively pointing said optical axis in a desired direction, and said optical shield being mounted to said image acquisition system and configured for shielding said image acquisition unit from receiving undesired electromagnetic radiation from at least one direction inclined at an angle not less than a shielding angle to the optical axis, wherein said optical shield is configured for avoiding significantly reducing the overall stiffness of said image acquisition unit when mounted thereto, wherein said optical shield is configured for being deployed between a retracted configuration, in which said optical shield has a compact retracted volume, and a deployed configuration, in which said optical shield has an extended volume having an aperture having an aperture dimension and length having a length dimension, wherein an angle corresponding to a ratio of said aperture dimension to said length dimension is not less than said shielding angle, wherein said image acquisition unit is configured for providing images via said aperture.

21. An optical imaging system for an airborne platform or the like, comprising an image acquisition unit, a pointing mechanism and an optical shield, said image acquisition unit having an optical axis and configured for providing images in a direction along said axis, said image acquisition unit being mounted to said pointing mechanism, said pointing mechanism being configured for selectively pointing said optical axis in a desired direction, and said optical shield being mounted to said image acquisition system and configured for shielding said image acquisition unit from receiving undesired electromagnetic radiation from at least one direction substantially different from said desired direction, said image acquisition unit having a stiffness characteristic, wherein said optical shield is configured for avoiding significantly affecting said stiffness characteristic of said image acquisition unit.

* * * * *